US012759459B2

(12) United States Patent
Bennett

(10) Patent No.: US 12,759,459 B2
(45) Date of Patent: Oct. 13, 2026

(54) MIRROR BRACKET

(71) Applicant: Quadratec, Inc., West Chester, PA (US)

(72) Inventor: Patrick W Bennett, Kennett Square, PA (US)

( * ) Notice: Subject to any disclaimer, the term of this patent is extended or adjusted under 35 U.S.C. 154(b) by 82 days.

(21) Appl. No.: 18/777,727

(22) Filed: Jul. 19, 2024

(65) Prior Publication Data

US 2025/0033561 A1 Jan. 30, 2025

Related U.S. Application Data

(60) Provisional application No. 63/515,238, filed on Jul. 24, 2023.

(51) Int. Cl.
*B60R 1/00* (2022.01)

(52) U.S. Cl.
CPC .................................... *B60R 1/006* (2013.01)

(58) Field of Classification Search
CPC .................................. B60R 1/006; B60R 1/06
USPC ................................. 248/466, 476, 479, 488
See application file for complete search history.

(56) References Cited

U.S. PATENT DOCUMENTS 1,465,213 A * 8/1923 Feinberg ................... B60R 1/06 248/231.51
1,891,966 A * 12/1932 Withrow ................... B60R 1/06 359/872
1,972,246 A * 9/1934 Sauer ........................ B60R 1/06 D12/189
2,143,281 A * 1/1939 Sauer ........................ B60R 1/06 248/213.1
2,259,179 A * 10/1941 Sauer ........................ B60R 1/06 248/901
2,411,421 A * 11/1946 Golden ..................... B60R 1/06 248/901
2,458,117 A * 1/1949 Tolbert .................. B60R 1/0605 248/213.1
2,526,306 A * 10/1950 Van Gelder ............. B60R 1/078 248/480
2,616,648 A * 11/1952 Budreck ................... B60R 1/06 248/278.1
2,643,847 A * 6/1953 Mcdevitt ................... B60R 1/06 248/122.1
D222,710 S * 12/1971 Kirwin et al. ............... D12/189
3,995,945 A * 12/1976 Addicks ................... B62J 29/00 359/842
4,500,063 A * 2/1985 Schmidt .................... B60R 1/06 248/314
4,711,538 A * 12/1987 Ohs ......................... B60R 1/078 248/480

(Continued)

*Primary Examiner* — Muhammad Ijaz

(57) ABSTRACT

A mirror bracket is adapted for coupling a mirror to a vehicle. The mirror bracket comprises a main member that has a front surface and a rear surface, the rear surface adapted for placement so that it is facing a side body panel of the vehicle; a side lip orthogonal to the rear surface; a bracket attachment location adapted for attaching the main member to the side body panel; an arm attachment structure for attaching an arm to the mirror bracket, wherein the mirror is attached to an end of the arm; wherein the arm attachment structure faces the front surface of the mirror bracket and the side lip extends away from the rear surface of the mirror bracket and is adapted to face a door jamb of the vehicle.

20 Claims, 13 Drawing Sheets

(56) References Cited

U.S. PATENT DOCUMENTS 4,715,701 A * 12/1987 Urban .................. B60R 1/0605 248/467
5,014,641 A * 5/1991 Johnson ..................... B62J 6/20 116/28 R
5,259,582 A * 11/1993 DeLange, III ............ B60R 1/02 248/481
RE34,525 E * 2/1994 Lazzaroni ................ A42B 3/04 379/430
D358,795 S * 5/1995 Viola ........................... D12/187
5,516,073 A * 5/1996 McMahan ................. B60R 1/06 248/549
5,964,443 A * 10/1999 Leveille .................... B60R 1/06 248/478
5,971,554 A * 10/1999 Henion ..................... B60R 1/06 359/872
6,132,051 A * 10/2000 Morell ...................... B60R 1/04 359/872
6,217,180 B1 * 4/2001 Eisenbraum ............ B62B 9/005 359/872
6,764,056 B1 * 7/2004 Wu ........................... B60R 1/06 248/479
D581,334 S * 11/2008 Courbon ...................... D12/187
7,490,946 B1 * 2/2009 Foote ...................... B60R 1/076 248/478
D713,056 S * 9/2014 Gulick ........................... D6/310
11,077,797 B2 * 8/2021 Henion ..................... B60R 1/12
12,263,907 B1 * 4/2025 Daskoski ................. B62J 29/00
2004/0135054 A1 * 7/2004 De Leon ................. B60R 1/078 248/475.1
2005/0134984 A1 * 6/2005 Kuo ........................ B60R 1/076 359/879
2006/0152831 A1 * 7/2006 Dumont .................. B60R 1/072 359/872
2006/0193068 A1 * 8/2006 Englander ............. B60R 1/0605 359/879
2011/0140471 A1 * 6/2011 Suesse ..................... B62J 29/00 296/1.11
2012/0132685 A1 * 5/2012 Lee .................... F16M 11/2014 224/553
2013/0120865 A1 * 5/2013 Toyama .................... B60R 1/06 359/841
2013/0286493 A1 * 10/2013 Hoff ......................... B62J 29/00 359/842
2014/0268379 A1 * 9/2014 Kelly ........................ B60R 1/06 359/876
2015/0098145 A1 * 4/2015 Milbank ................. F16B 2/065 248/229.12
2015/0239327 A1 * 8/2015 Brancaleone ............. B60R 1/06 296/146.6
2015/0251718 A1 * 9/2015 Hoff ......................... B62J 29/00 359/842
2016/0102702 A1 * 4/2016 Lang ......................... B60R 1/06 248/479
2017/0106799 A1 * 4/2017 Di Gusto ................ B60R 1/076
2019/0256001 A1 * 8/2019 Weston ..................... B60R 1/12
2020/0384921 A1 * 12/2020 Stanger .................... B62J 29/00
2023/0104179 A1 * 4/2023 Lawrence ............... B60R 11/04 348/148
2023/0110906 A1 * 4/2023 Moriyama ................ B60R 1/06 296/146.6
2025/0033561 A1 * 1/2025 Bennett ..................... B60R 1/06
2025/0269794 A1 * 8/2025 Davis .................... B60R 1/0602

* cited by examiner

MIRROR BRACKET

CROSS REFERENCE TO RELATED APPLICATIONS

This application claims priority under 35 U.S.C. 119 to U.S. Provisional Application 63/515,238 filed on Jul. 24, 2023 which is hereby incorporated by reference in its entirety.

FIELD OF THE INVENTION

The present invention relates to vehicle mirrors, and more specifically to the attachment of vehicle mirrors to vehicles. In particular, a mirror bracket is disclosed that enables stable attachment of a vehicle mirror to a vehicle.

BACKGROUND OF THE INVENTION

Vehicles include mirrors that enable the driver to see around the periphery of the vehicle being driven. For example, mirrors are useful for enabling the driver to see objects that are next to the vehicle and behind the vehicle. One type of mirror that is included with vehicles is called a side view mirror. Vehicles will typically have a left side view mirror (on the left or driver side of the vehicle) and a right side mirror (on the right or passenger side of the vehicle). While such mirrors require careful use (for example, when an object is in a driver's blind spot), such mirrors facilitate driving of the vehicle and help to avoid accidents.

One type of vehicle that includes side view mirrors is a vehicle known as a Jeep vehicle. Jeep vehicles include an interesting feature: removal of the doors is fairly simple and many people enjoy driving Jeep vehicles without doors. However, for many vehicles, side view mirrors are attached to the vehicle's doors. Thus, when the doors of a vehicle are removed, if the side view mirrors were attached to the doors, then removal of the doors causes the vehicle to be without any side view mirrors.

One approach to dealing with this issue is to mount the side view mirrors at a vehicle location other than the doors. For example, an alternative mounting location for side view mirrors is the vehicle body forward of the doors. When the side view mirrors are attached to the vehicle forward of the doors, removal of the doors does not cause elimination of the side view mirrors. In this manner, the doors may be removed, but the side view mirrors remain.

While attaching the mirrors to the vehicle body forward of the doors eliminates the problem of being without mirrors when the doors are removed, such mirror mounting may be undesirable due to a lack of stability. In other words, by mounting the mirrors in this manner, the attachment to the vehicle may be undesirably unstable, causing the mirror to shake or vibrate as the vehicle is being driven. If the mirror is shaking or vibrating while the vehicle is being driven, this may result in an undesirable driving experience.

SUMMARY OF THE INVENTION

A mirror bracket is adapted for coupling a mirror to a vehicle. The mirror bracket comprises a main member that has a front surface and a rear surface, the rear surface adapted for facing towards a side body panel of said vehicle; a side lip orthogonal to the rear surface; a bracket attachment location for attaching the main member to the side body panel; an arm attachment structure for attaching an arm to the mirror bracket, wherein the mirror is attached to an end of the arm; wherein the arm attachment structure is coupled to the front surface of the main member.

DETAILED DESCRIPTION

Figure 1:
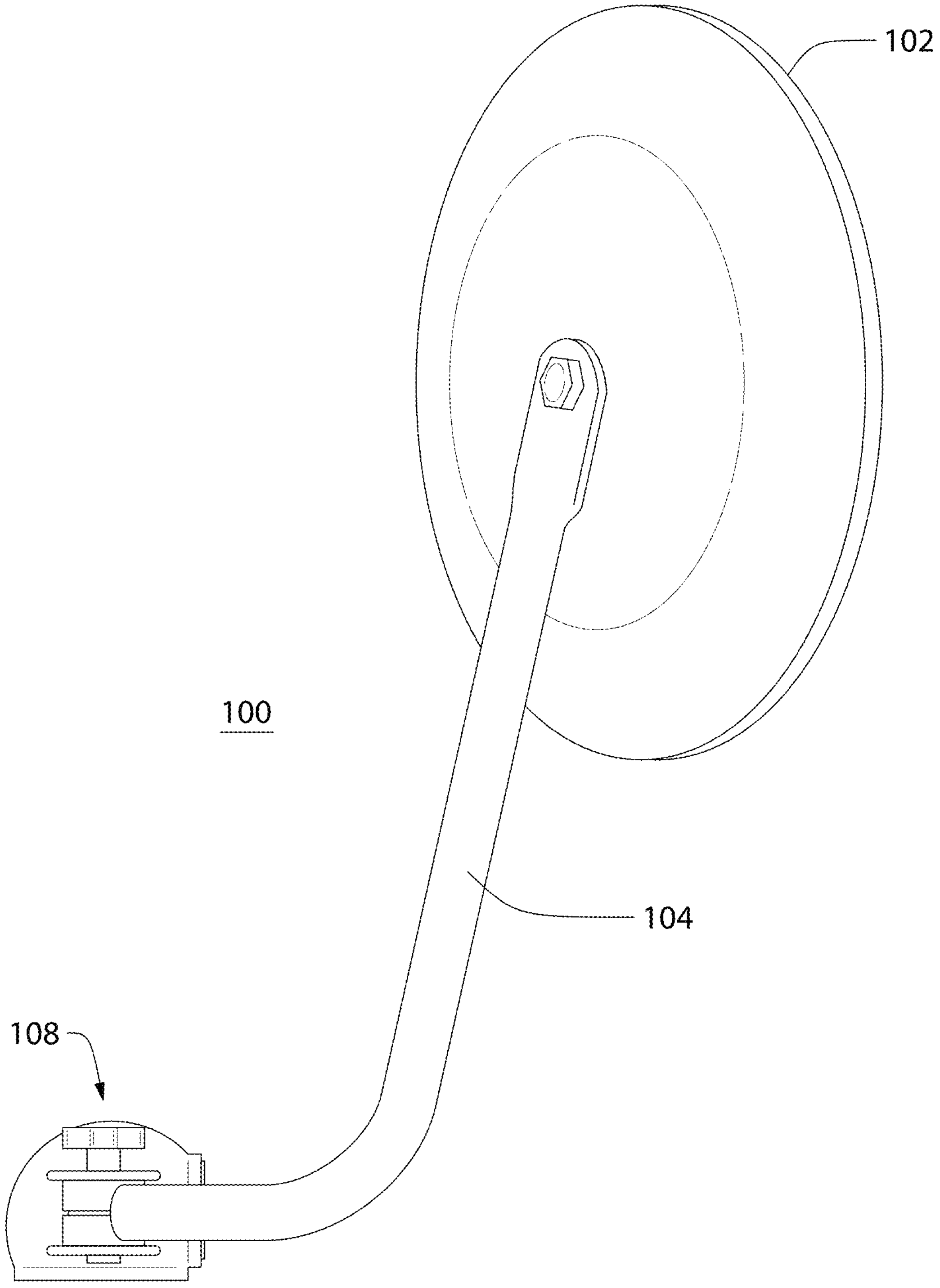
FIG. 1 is a perspective view of a mirror assembly in accordance with an exemplary embodiment of the present invention.

FIG. 1 is a perspective drawing of mirror assembly 100 in accordance with an exemplary embodiment of the present invention. Mirror assembly 100 includes mirror 102. Mirror 102 is illustrated as being round but this is merely exemplary, as other shapes may be used. Attached to mirror 102 is arm 104. Arm 104 is desirably a rigid material that maintains mirror 102 in a location where the mirror can be seen by a driver of a vehicle. Arm 104 is coupled to bracket assembly 108. Bracket assembly 108 is in turn attached to a vehicle (not shown).

Figure 2:
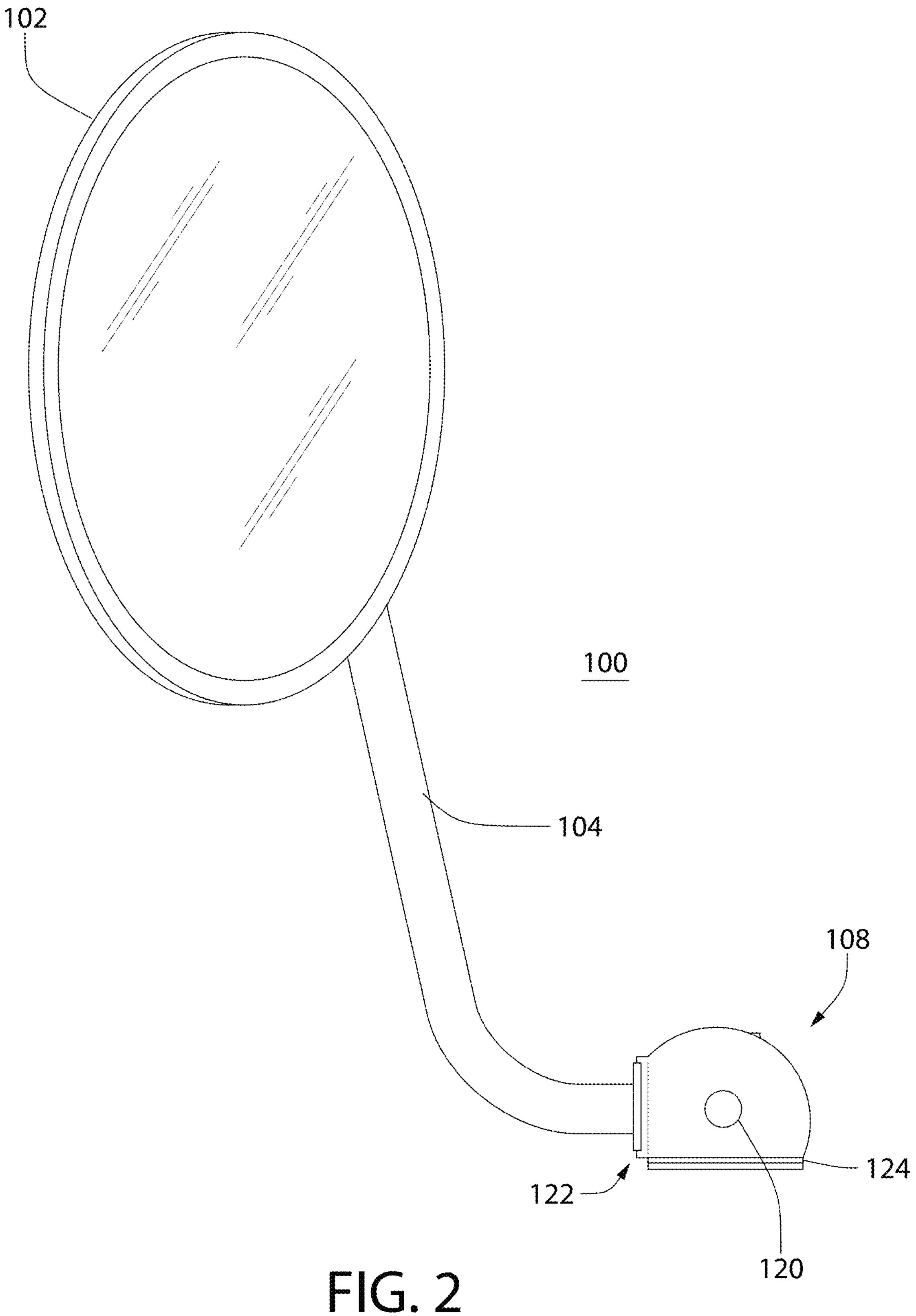
FIG. 2 is a further perspective view of a mirror assembly, rotated 180 degrees from the view illustrated in FIG. 1, in accordance with an exemplary embodiment of the present invention.

FIG. 2 is a perspective drawing of mirror assembly 100 shown from an opposite side of that shown in FIG. 1. Mirror 102 is shown. Arm 104 is also shown. Arm 104 is attached to bracket assembly 108. Bracket assembly 108 includes side member 122 and optionally includes bottom lip 124. Opening 120 is included. Opening 120 (which may be a bracket attachment location) is formed in bracket assembly 108 and is used for attaching bracket assembly 108 to the vehicle.

Figure 3:
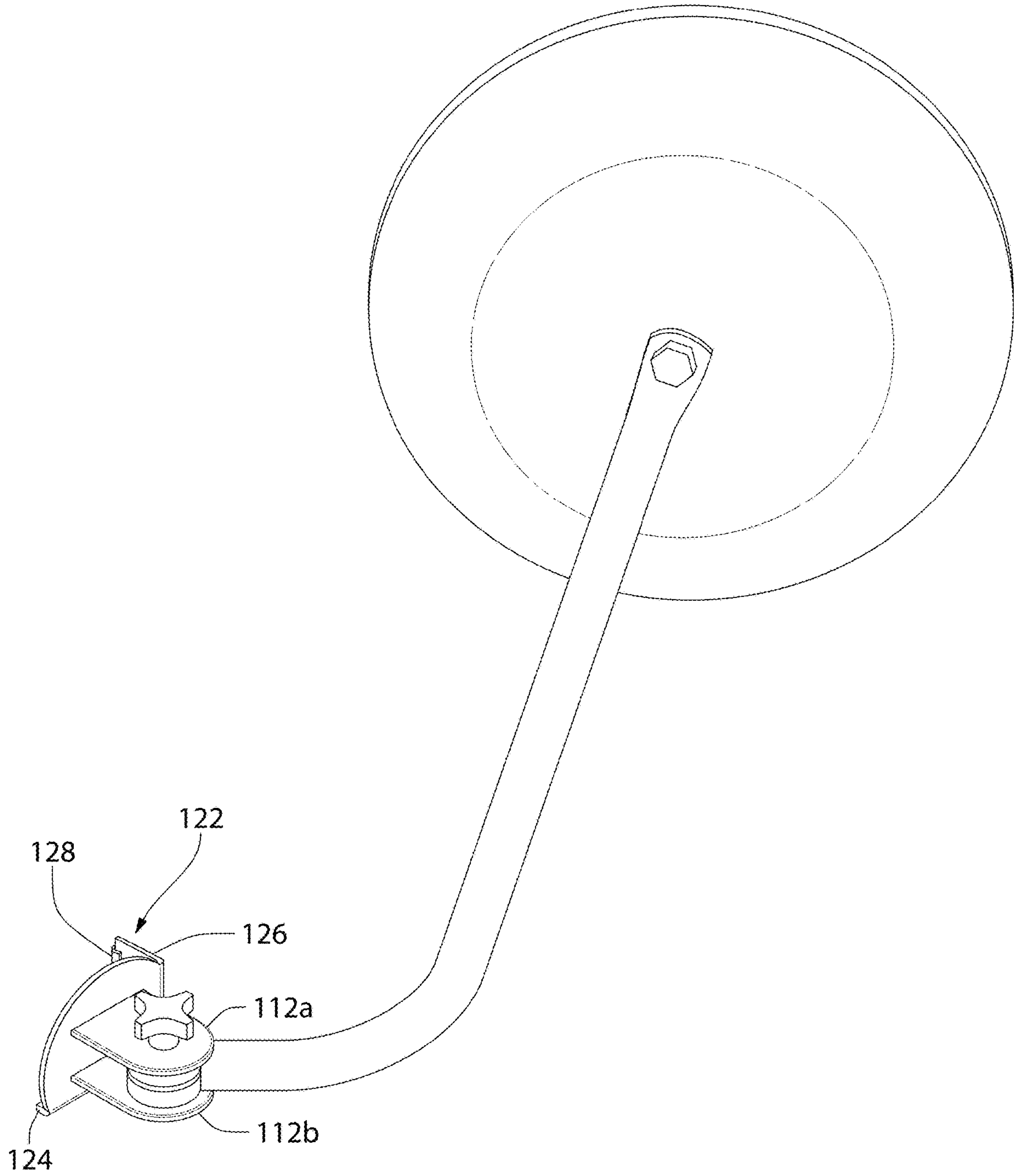
FIG. 3 is a further perspective view of a mirror assembly, taken from a different angle than what appears in FIG. 1 and FIG. 2, in accordance with an exemplary embodiment of the present invention.

FIG. 3 illustrates mirror assembly 100 from a further orientation. In this exemplary embodiment, top member 112*a* and bottom member 112*b* are shown. Top member 112*a* and bottom member 112*b* extend orthogonally from main member 110. Side lip 126 extends orthogonally from main member 110. Edge member 128 is optionally attached to an outer edge of side lip 126. Side lip 126 and edge member 128 are included with side member 122. Side member 122 extends orthogonally from main member 110.

Figure 4:
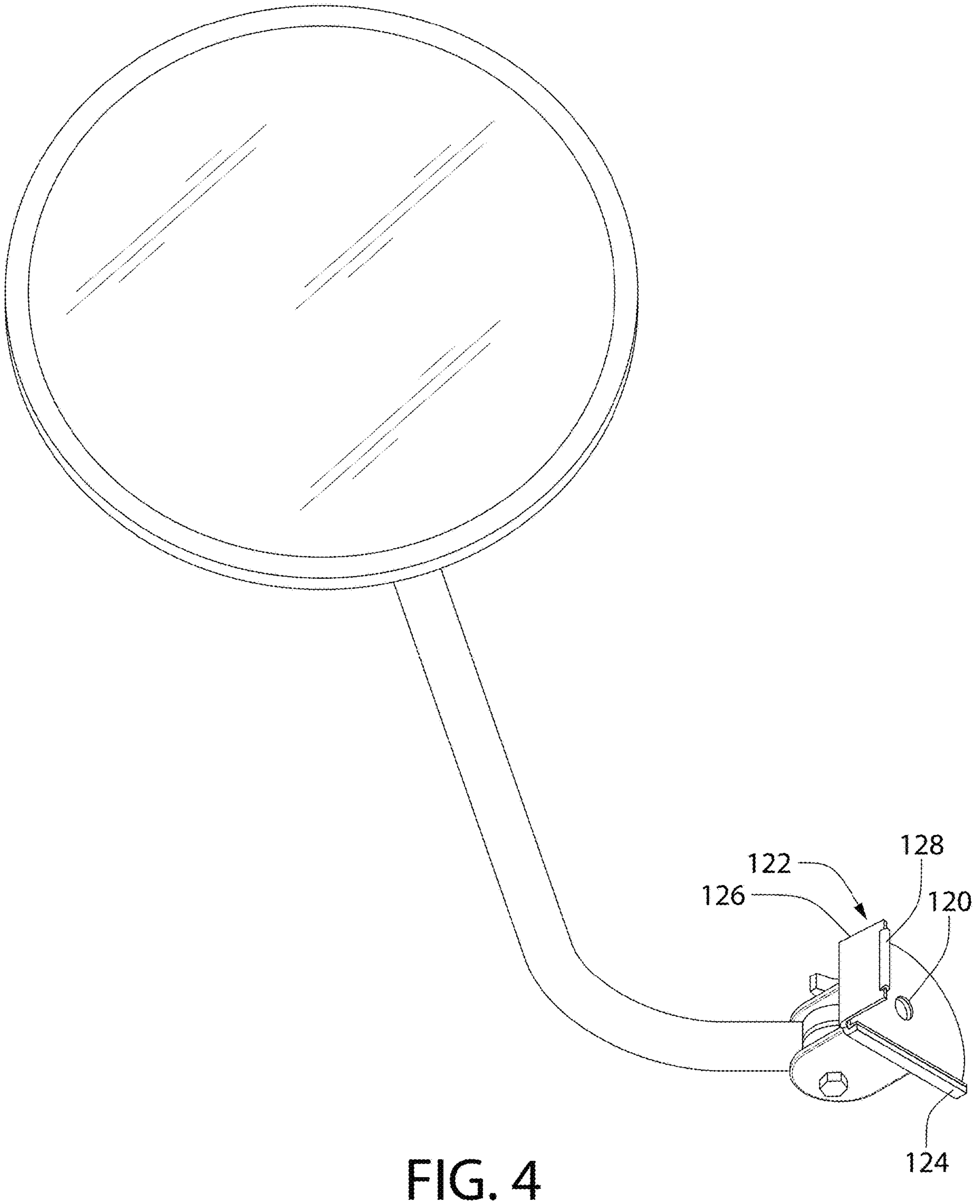
FIG. 4 is a further perspective view of the mirror assembly illustrated in FIG. 1, FIG. 2, and FIG. 3, in accordance with an exemplary embodiment of the present invention.

FIG. 4 is a perspective view of mirror assembly 100 that is rendered from a different orientation than what is illustrated in FIG. one, FIG. 2, and FIG. 3. In FIG. 4, bracket assembly 108 is shown from a different perspective than as it appears in previous figures. Side member 122 extends orthogonally from main member 110. Side member 122 includes side lip 126 and optionally includes edge member 128. Optional bottom lip 124 is also illustrated. Optional bottom lip 124 extends orthogonally from main member 110. Opening 120 is shown. Opening 120 (which may be a bracket attachment location) is used for attaching bracket assembly 108 to the vehicle.

Figure 5:
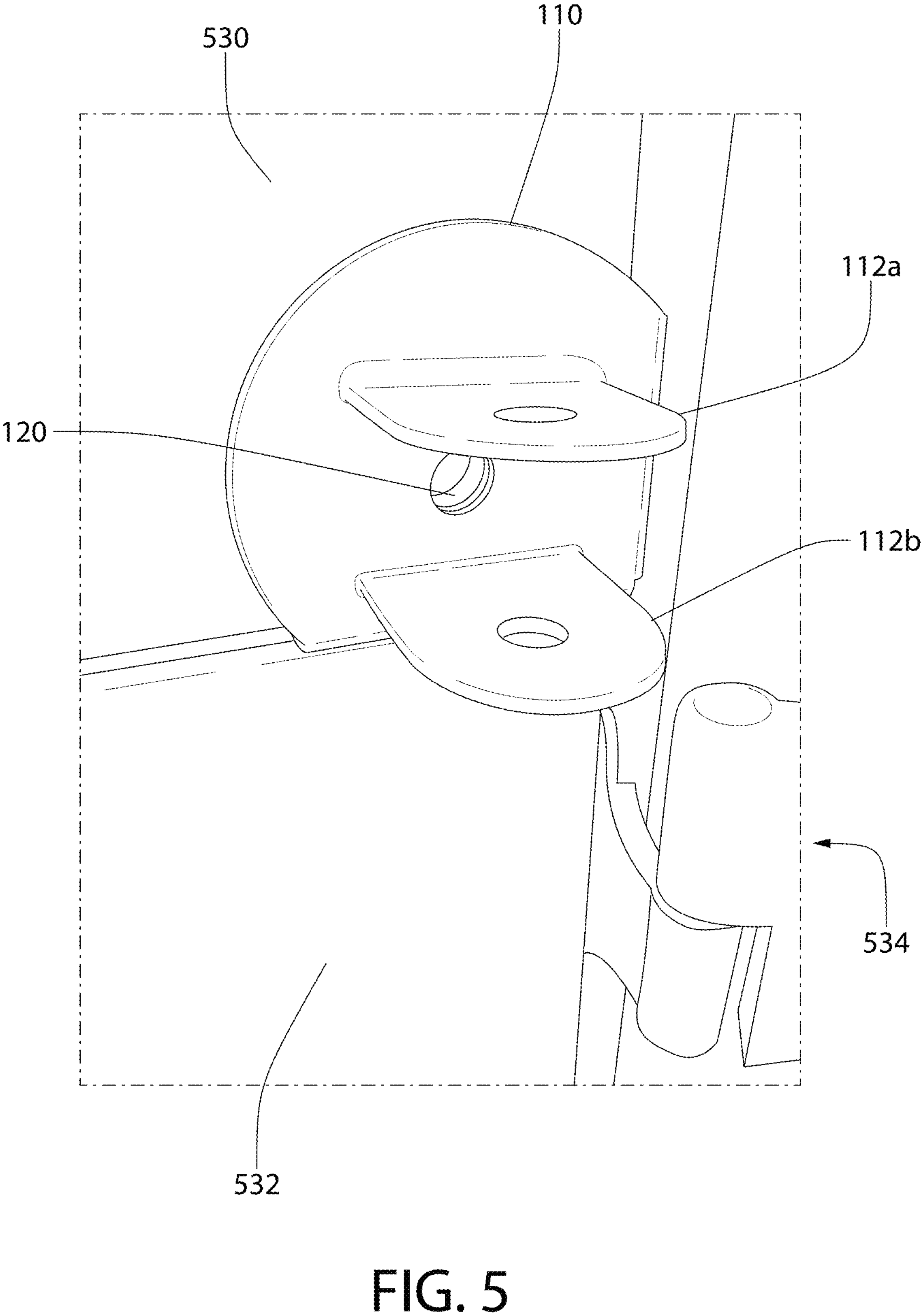
FIG. 5 is a close-up view of a main member of a mirror assembly in accordance with an exemplary embodiment of the present invention.

FIG. 5 is a prospective close-up view of bracket assembly 108. As shown in FIG. 5, top member 112*a* and bottom member 112*b* extends orthogonally from main member 110. Opening 120 is included for attaching bracket assembly 108 to the vehicle. In particular, when in use, bracket assembly 108 is attached to body panel 530. Body panel 530 is situated above body panel 532. Between body panel 530 and 532 there is a crease. Optional bottom lip 124 may be aligned with the crease. As shown in FIG. 5, bracket assembly 108 is attached to the vehicle at the door jamb of the vehicle. Hinge 534 of the vehicle appears in FIG. 5.

Figure 6A:
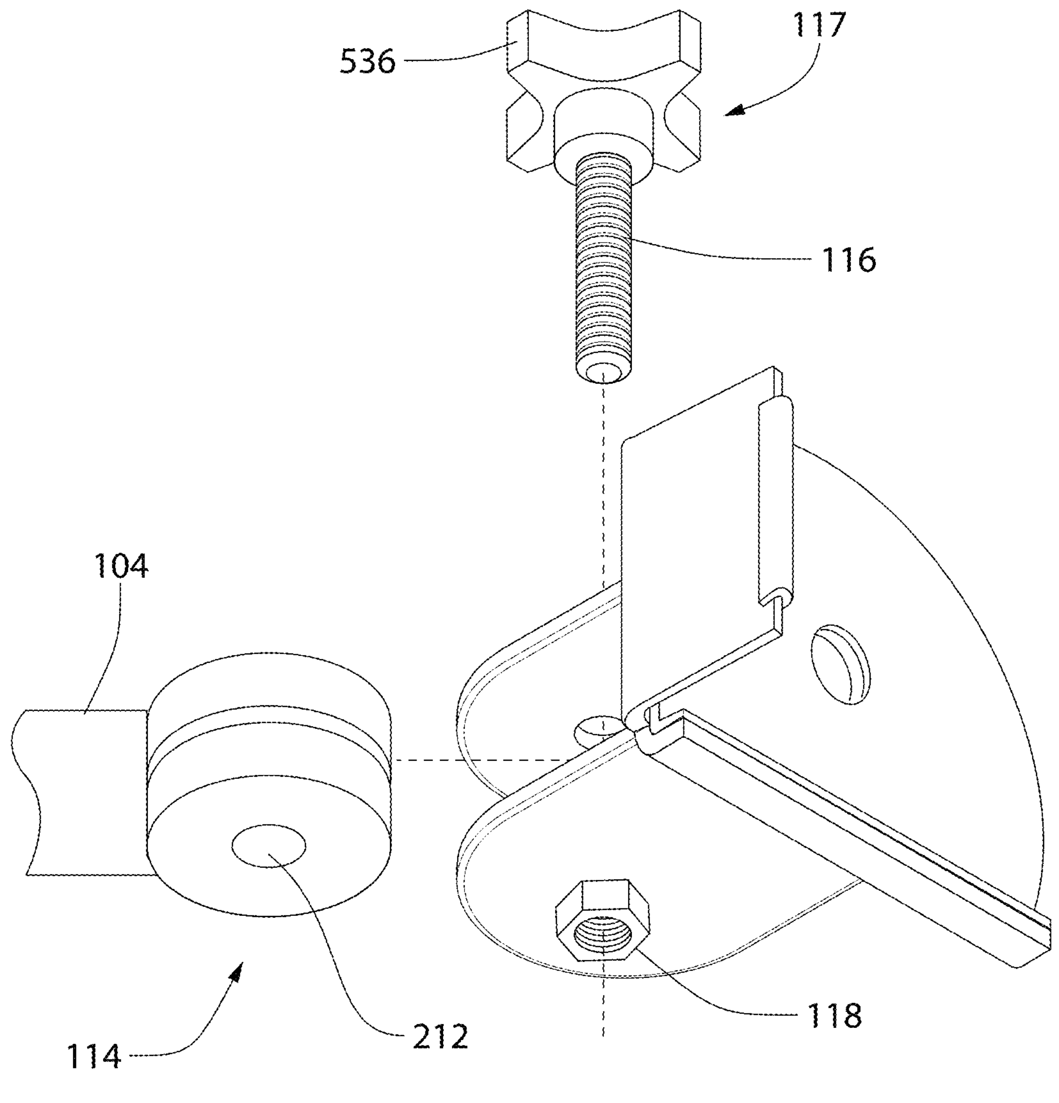
FIG. 6A is an exploded view of a main member of a mirror assembly, and related parts, in accordance with an exemplary embodiment of the present invention.

FIG. 6A is a further perspective view of bracket assembly 108. In FIG. 6A, pivot member 114 is illustrated. Pivot member 114 is coupled to arm 104. Pivot member 114 includes opening 212. Attachment member 117 is shown. Attachment member 117 enables pivot member 114 to be attached to bracket assembly 108. Bracket assembly 108 includes nut 118. Attachment member 117 includes knob 536 and bolt 116, but this is merely exemplary. As shown, pivot member 114 is placed between top member 112*a* and bottom member 112*b*. Attachment member 117 is then inserted through an opening situated in top member 112*a*. Attachment member 117 extends through opening 212 and through an opening in bottom member 112*b*. Attachment member 117 then engages nut 118. In this matter, pivot member 114 is coupled to bracket assembly 108.

Figure 6B:
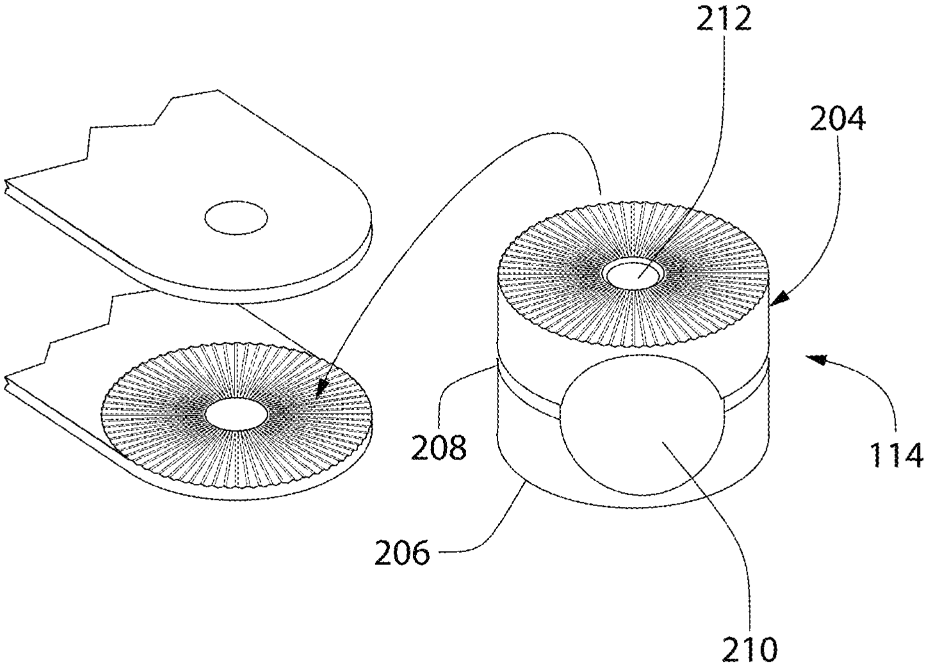
FIG. 6B illustrates A pivot member that is included with a mirror assembly in accordance with an exemplary embodiment of the present invention.

FIG. 6B is a further perspective view of top member 112*a*, bottom member 112*b*, and pivot member 114. Pivot member 114 is inserted between top member 112*a* and bottom member 112*b*. Pivot member 114 includes upper portion 204 and lower portion 206. Upper portion 204 and lower portion 206 may be attached with a tab (not shown) that maintains upper portion 204 stationary relative to lower portion 206 as illustrated in FIG. 6B. Upper portion 204 and lower portion 206 are maintained relative to each other with space 208 therebetween. Pivot member 114 includes opening 210. Opening 210 is shaped to receive arm 104.

Figure 7:
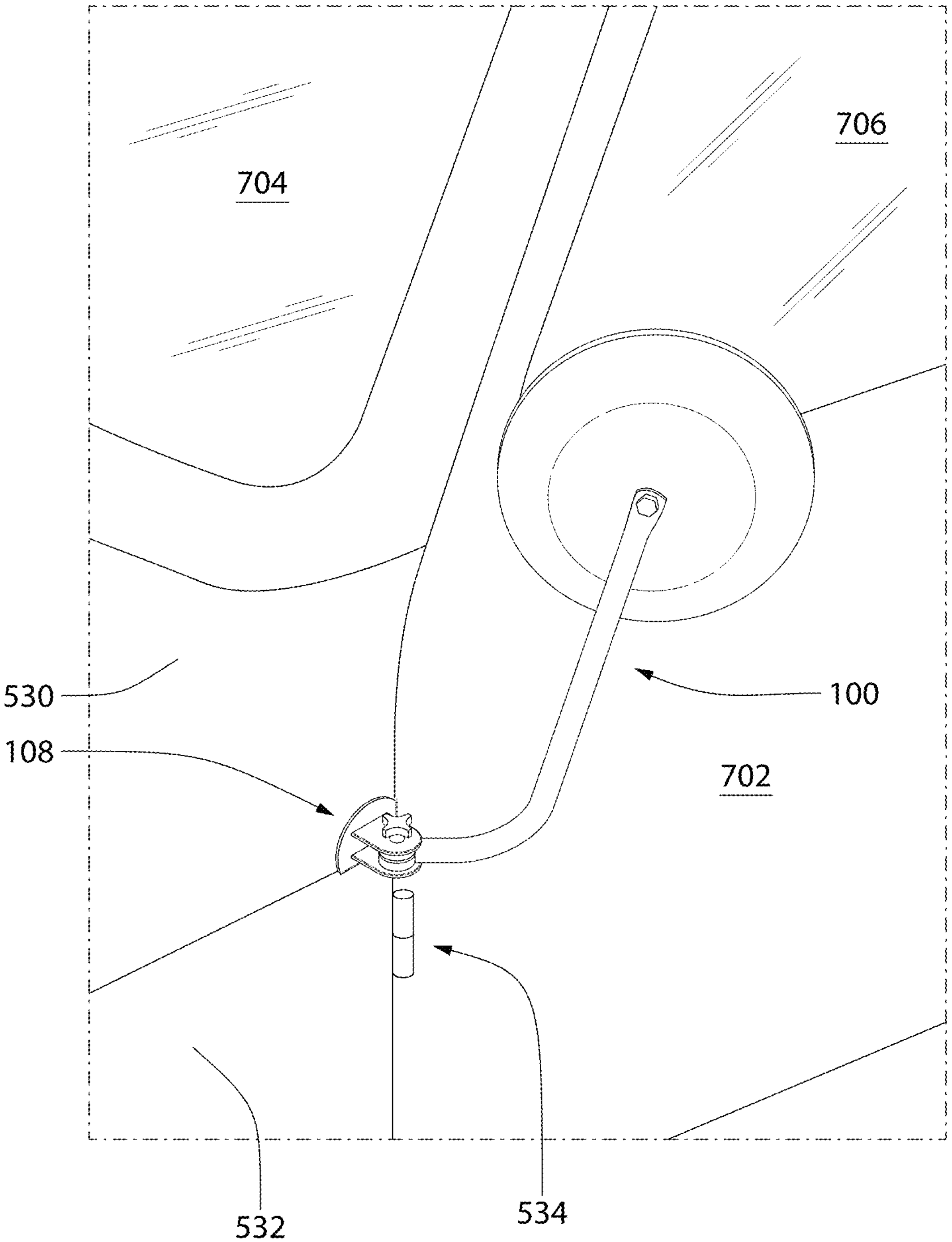
FIG. 7 is a perspective view of a mirror assembly mounted to a vehicle in accordance with an exemplary embodiment of the present invention.

FIG. 7 is a perspective view in which mirror assembly 100 is attached to a vehicle. In FIG. 7, door panel 702 and windows 706 are shown on the driver side of a vehicle. Bracket assembly 108 is attached to body panel 530. Body panel 530 is situated below windshield 704. Body panel 532 is below body panel 530. Hinge 534 is shown.

Figure 8:
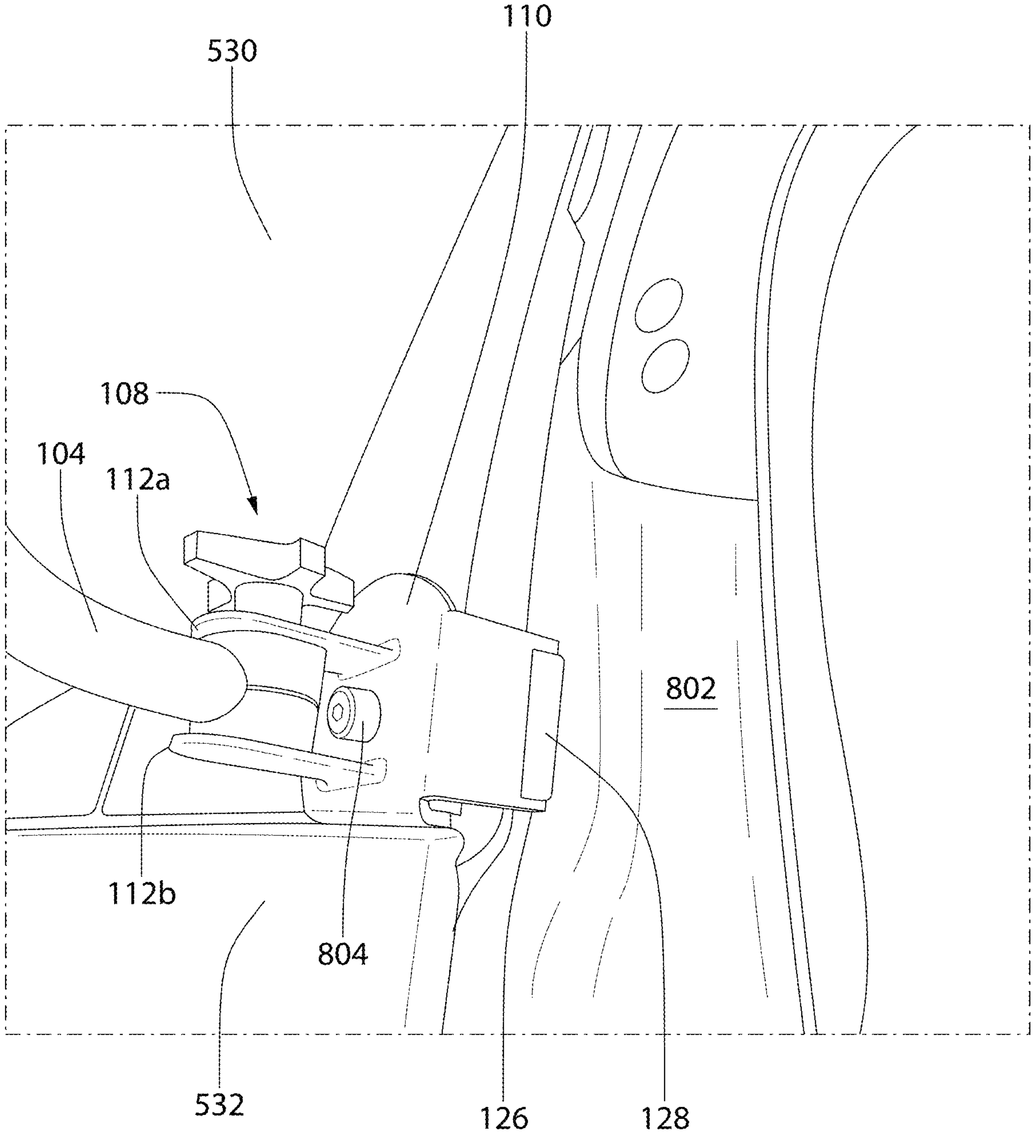
FIG. 8 is a further perspective view of a mirror bracket attached to a vehicle, with the vehicle door removed, in accordance with an exemplary embodiment of the present invention.

FIG. 8 is a further perspective view of bracket assembly 108 attached to a vehicle. As shown, main member 110 is placed against body panel 530. Bottom lip 124 is aligned with a crease between body panel 530 and body panel 532. Top member 112*a* and bottom member 112*b* extend orthogonally forward from main member 110. Main member 110 is attached to body panel 530 via bolt 804. Bolt 804 extends through opening 120. Arm 104 is attached to bracket assembly 108. Side lip 126 extends orthogonally backwards from main member 110. As shown in FIG. 8, side lip 126 is adjacent to the front door jamb 802 of the vehicle. Optional edge member 128 is situated along the back edge of side lip 126. Edge member 128 may be made, for example, of a flexible material (such as rubber or foam), and it may wrap around both sides of side lip 126. In FIG. 8 as shown, the front surface of main member 110 faces top member 112*a* and bottom member 112*b*. The rear surface of main member 110 faces body panel 530. By securing bolt 804 (for example), main member 110 held stationary relative to body panel 530. Furthermore, by securing bolt 804 (for example) main member 110 may exert force (i.e. presses) towards body panel 530.

In FIG. 8, the door of the vehicle is not shown. This may be because the door is present in the vehicle, but has been omitted from the drawing, or the door has been removed from the vehicle. Bracket assembly 108 is in contact with the vehicle because side lip 126 faces front door jamb 802 and because the rear surface of main member 110 faces body panel 530. Thus, main member 110 is in contact with body panel 530 and side lip 126 is in contact with front door jamb 802. Thus, bracket assembly 108 has two surfaces of contact with the vehicle. The first surface of contact with the vehicle is with body panel 530. The second surface of contact with the vehicle is with front door jamb 802. By attaching main member 110 to the vehicle, main member 110 is held stationary relative to body panel 530 and door jamb 802. In the prior art, a mirror bracket may be in contact with body panel. However, in the prior art, the mirror bracket is not in contact with both a body panel and the door jam. As illustrated in FIG. 8, the rear surface of main member 110 is in contact with body panel 530, and side lip 126 is in contact with front door jamb 802. It is because bracket assembly 108 is in contact with both the body panel and the door jamb that the mirror bracket has a high level of stability. This high level of stability maintains mirror 102 stationary as a vehicle is being driven. This is highly desirable for a driver, as the mirror stays stationary without shaking or vibration as the vehicle is driven.

Figure 9:
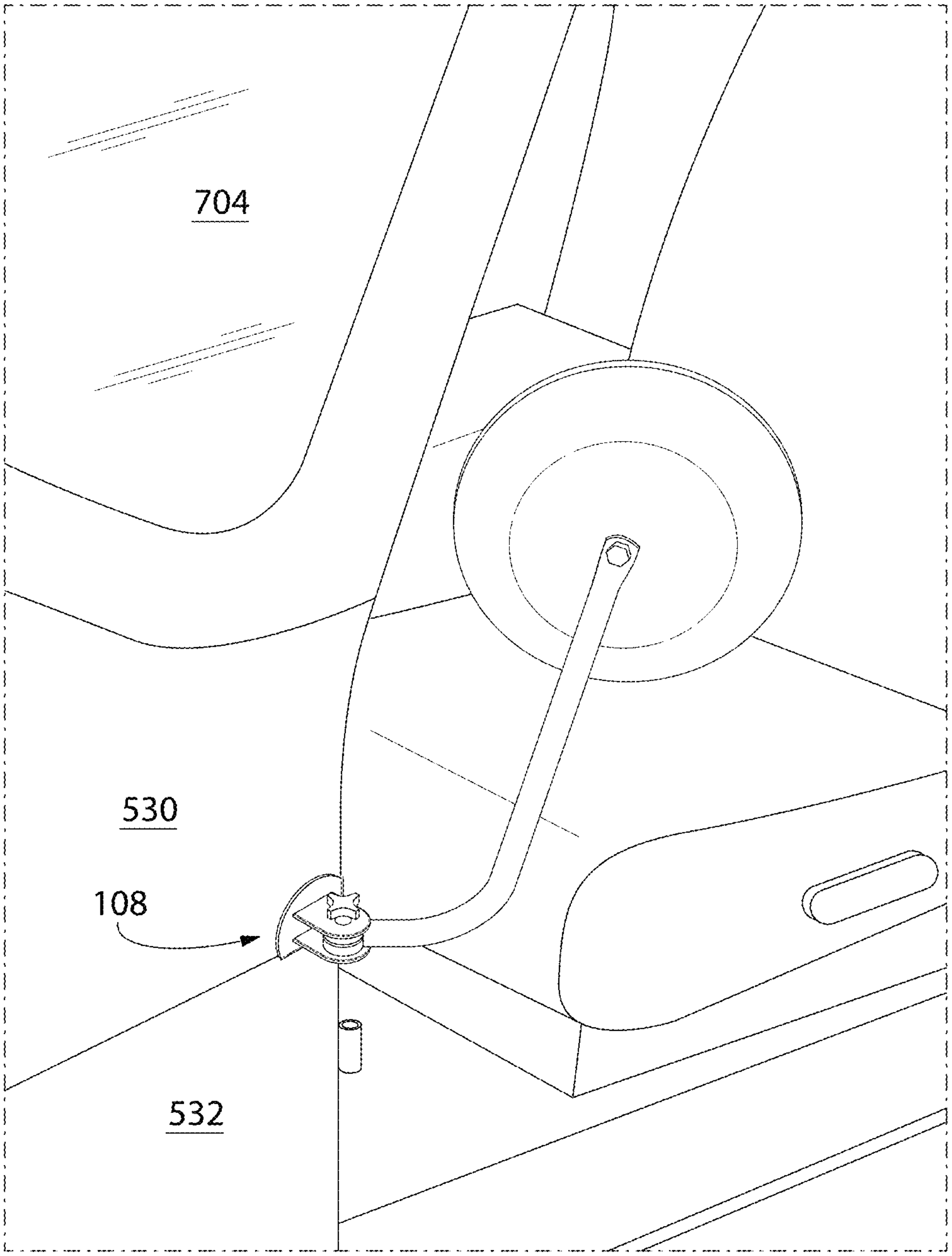
FIG. 9 illustrates a mirror bracket attached to a vehicle, with the vehicle door removed, in accordance with an exemplary embodiment of the present invention.

FIG. 9 is a further exemplary embodiment of the present invention. In FIG. 9, the door of the vehicle has been removed. Bracket assembly 108 remains attached to the vehicle even though the door has been removed. Bracket assembly 108 is again attached to the vehicle via body panel 530. Body panel 530 is above body panel 532. Windshield 704 is above body panel 530.

Figure 10:
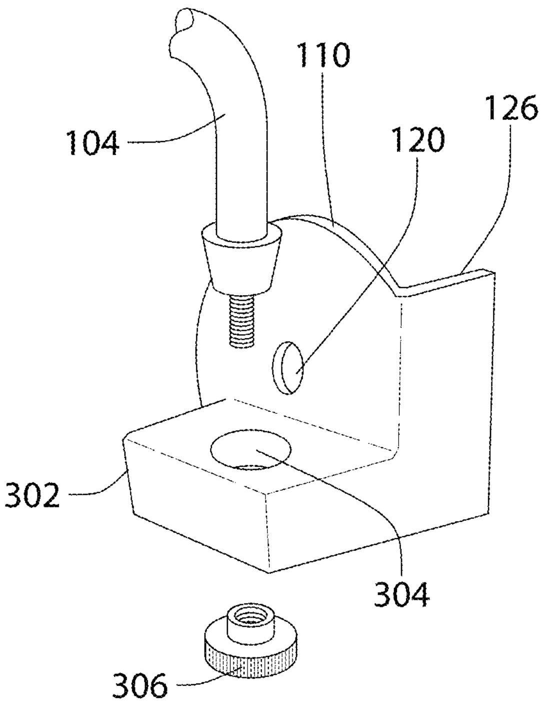
FIG. 10 illustrates a perspective drawing of an alternative embodiment in which a bracket assembly is attached to a mirror bracket in accordance with an exemplary embodiment of the present invention.
Figure 11:
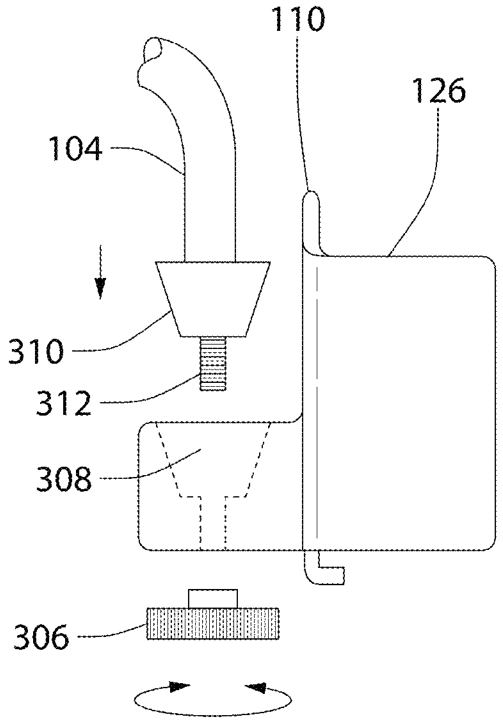
FIG. 11 illustrates a further perspective drawing of an alternative embodiment in which a bracket assembly is attached to a mirror bracket in accordance with an exemplary embodiment of the present invention.

FIG. 10 and FIG. 11 illustrate an alternative embodiment of the present invention. FIG. 10 is a perspective view of an alternative embodiment. FIG. 11 is a side view of an alternative embodiment. Arm 104 terminates with bottom 310 and projection 312. Bottom 310 and projection 312 may be inserted into opening 308. Opening 308 is visible in FIG. 10 as opening entry 304. Opening 308 is formed in base 302. When bottom 310 and projection 312 are inserted into opening 308, arm 104 is held in place via retainer 306. Retainer 306 may be attached to projection 312 via threads shown in FIG. 10 and FIG. 11. By securing retainer 306 to projection 312, arm 104 is held in place.

Figure 12:
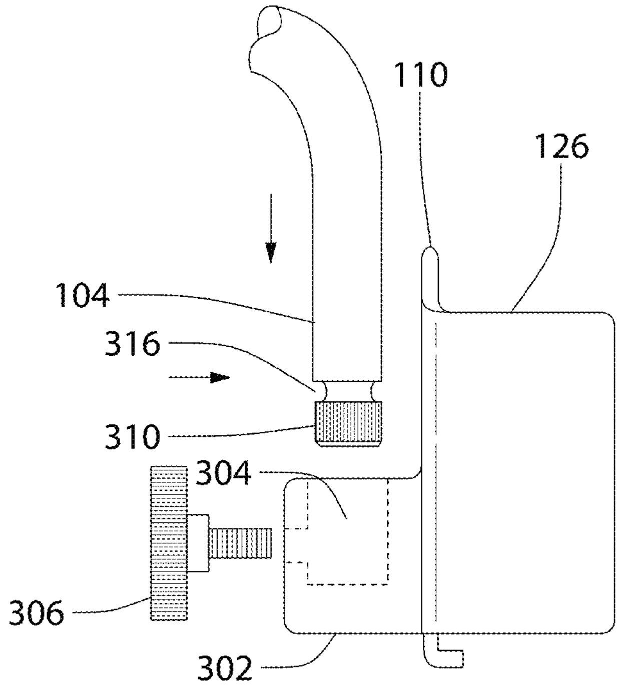
FIG. 12 illustrates a further perspective drawing of an alternative embodiment in which a bracket assembly is attached to a mirror bracket in accordance with an exemplary embodiment of the present invention.
Figure 13:
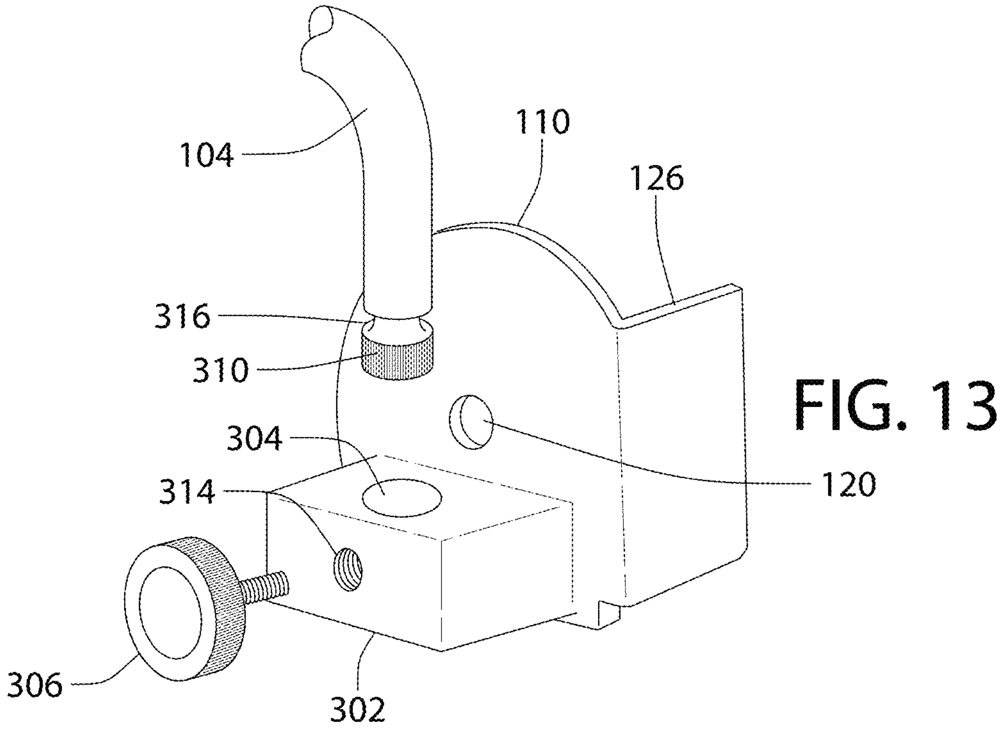
FIG. 13 illustrates a further perspective drawing of an alternative embodiment in which a bracket assembly is attached to a mirror bracket in accordance with an exemplary embodiment of the present invention.

FIG. 12 and FIG. 13 illustrate an alternative exemplary embodiment of the present invention. In FIG. 12 and FIG. 13, arm 104 terminates with bottom portion 316 and bottom 310. Bottom portion 316 and bottom 310 may be inserted into opening entry 304. After bottom portion 316 and bottom 310 are inserted into opening entry 304, retainer 306 may be inserted into opening 314. As shown, opening 314 may be a threaded opening that is formed within base 302. By inserting retainer 306 into opening 314 so that retainer 306 locks bottom 310 in place, arm 104 is attached to bracket assembly 108.

Figure 15:
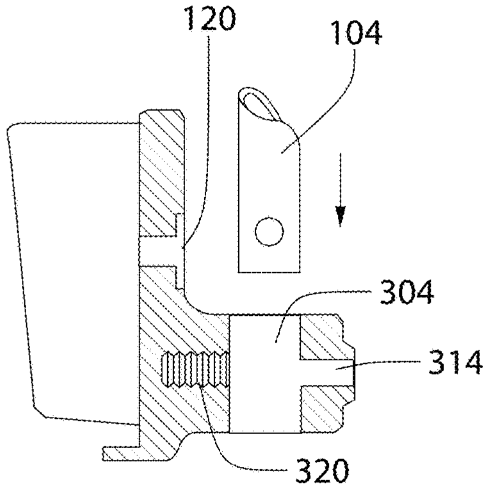
FIG. 15 is a sectional view of the mirror bracket illustrated in FIG. 14.
Figure 14:
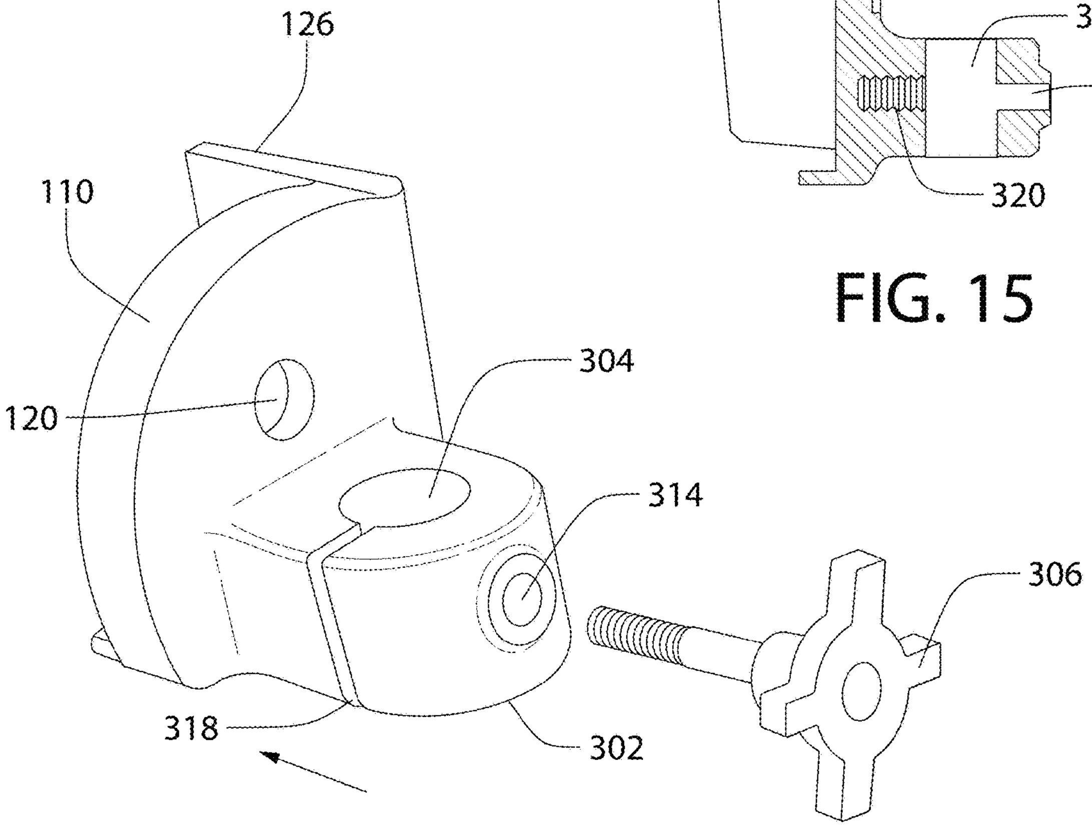
FIG. 14 illustrates a further prospective drawing of an alternative embodiment in which a bracket assembly is attached to a mirror bracket in accordance with an exemplary embodiment of the present invention.

FIG. 14 and FIG. 15 are further views of an alternative embodiment of the present invention. In FIG. 14, main member 110 is included. Main member 110 includes opening 120 for attaching bracket assembly 108 to body panel 530. Side lip 126 is shown. Side lip 126 extends orthogonally from main member 110. Base 302 is included. Base 302 includes opening entry 304 and space 318. Retainer 306 is included. During use, arm 104 is inserted into opening entry 304. Arm 104 includes an opening. Retainer 306 is inserted through opening 314, through the opening in arm 104, and into opening 320. Opening 320 is illustrated as being threaded, but this is merely exemplary. Thus, by inserting retainer 306 into opening 320, arm 104 is maintained in position. As previously explained, arm 104 is inserted into opening entry 304. By rotating retainer 306, base 302 is squeezed around arm 104 so that the distance between the top and bottom of space 318 is decreased. In this manner, base 302 holds arm 104 stationary within bracket assembly 108.

While various exemplary embodiments have been described, it is understood that embodiments may be combined. Also, aspects of one embodiment may be combined with aspects of another embodiment.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

PARTS LIST

100 Mirror Assembly
102 Mirror
104 Arm
108 Bracket Assembly
110 Main Member
112*a* Top Member
112*b* Bottom Member
114 Pivot Member
116 Bolt
117 Attachment Member
118 Nut
120 Opening
122 Side Member
124 Bottom Lip
126 Side Lip
128 Edge Member
204 Upper Portion
206 Lower Portion
208 Space
210 Opening
212 Opening
302 Base
304 Opening Entry
306 Retainer
308 Opening
310 Bottom
312 Projection
314 Opening
316 Bottom Portion
318 Space
320 Opening
530 Body Panel
532 Body Panel
534 Hinge
536 Knob
702 Door Panel
704 Windshield
706 Window
804 Bolt

The invention claimed is:

1. A mirror bracket adapted for coupling a mirror to a vehicle, the mirror bracket comprising:

a main member that has a front surface and a rear surface, the rear surface adapted for placement on a side-body portion of said vehicle between said front bumper and a front door opening of said vehicle;

a side lip orthogonal to said rear surface;

a bracket attachment location adapted for attaching said main member to said side body portion of said vehicle between said front bumper and said front door opening of said vehicle;

an arm attachment structure for attaching an arm to said mirror bracket, wherein said mirror is attached to said arm;

wherein said arm attachment structure faces said front surface of said main member and said side lip extends away from said rear surface and is adapted to contact a door jamb of the vehicle, wherein the door jamb is a fixed body structure surface facing the front door opening of said vehicle; and wherein the side lip extends orthogonally from said rear surface and extends as a continuous structure in a continuous linear direction from a proximal end at the rear surface of the main member to a terminus of the side lip that defines an end of the side lip.

2. The mirror bracket according to claim 1, wherein said side body panel is on said vehicle between a front of said vehicle and a front door located in said front door opening of said vehicle, said side body panel and said door have a gap therebetween, and said side lip is adapted to extend into said gap.

3. The mirror bracket according to claim 1, wherein said side lip extends from a side edge of said mirror bracket.

4. The mirror bracket according to claim 3, further comprising a bottom lip extending from a bottom edge of said mirror bracket and extending orthogonal to said rear surface.

5. The mirror bracket according to claim 1, wherein said bracket attachment location includes an opening, and a fastener extends through said opening and into said side body panel to secure said mirror bracket to said side body panel.

6. The mirror bracket according to claim 1, wherein said arm attachment structure includes a pivoting member this is coupled to said arm, and said pivoting member pivots said arm relative to said mirror bracket.

7. The mirror bracket according to claim 6, wherein said arm attachment structure includes at least one of an opening and a cylindrical member, and said arm pivots within said opening or about said cylindrical member, respectively.

8. The mirror bracket according to claim 1, wherein said rear surface of said main member is adapted to press towards said side body panel and said side lip is adapted to be in contact with said door jamb of said vehicle.

9. The mirror bracket of claim 1, wherein the terminus is a free edge of said side lip which is a furthermost edge of the side lip from the rear surface along said continuous linear direction.

10. The mirror bracket of claim 9, wherein the terminus which is said free edge is formed by the termination of opposing surfaces of the side lip, said opposing surfaces terminating at the free edge such that the free edge defines a terminal boundary of the side lip.

11. A method of attaching a mirror to a vehicle, the method comprising the steps providing a mirror bracket, wherein the mirror bracket comprises:

a main member that has a front surface and a rear surface;

a side lip orthogonal to said rear surface;

a bracket attachment location adapted for attaching said main member to a side body portion of said vehicle;

an arm attachment structure for attaching an arm to said mirror bracket, wherein said mirror is attached to said arm;

wherein said arm attachment structure faces said front surface of said main member and said side lip extends away from said rear surface;

placing the rear surface of the main member on said side body portion of the vehicle between said front bumper and a front door opening of said vehicle so that the side lip contacts a door jamb of said vehicle, wherein the door jamb is a fixed body structure surface that faces the front door opening of the vehicle, wherein the side lip extends orthogonally from said rear surface as a continuous structure in a continuous linear direction from a proximal end at the rear surface of the main member to a terminus of the side lip that defines an end of the side lip; and securing the mirror bracket to the vehicle via the bracket attachment location so that the main member is attached to said side body portion of said vehicle between said front bumper and said front door opening of said vehicle.

12. The method of attaching a mirror to a vehicle according to claim 11, wherein said side body panel is on said vehicle between a front of said vehicle and a front door located in said front door opening of said vehicle, said side body panel and said door have a gap therebetween, said method further comprising the step of inserting said side lip into said gap.

13. The method of attaching a mirror to a vehicle according to claim 11, wherein said side lip extends from a side edge of said mirror bracket.

14. The method of attaching a mirror to a vehicle according to claim 13, further comprising a bottom lip extending from a bottom edge of said mirror bracket and extending orthogonal to said rear surface.

15. The method of attaching a mirror to a vehicle according to claim 11, wherein said bracket attachment location includes an opening, and a fastener extends through said opening and into said side body panel to secure said mirror bracket to said side body panel.

16. The method of attaching a mirror to a vehicle according to claim 11, wherein said arm attachment structure includes a pivoting member this is coupled to said arm, and said pivoting member pivots said arm relative to said mirror bracket.

17. The method of attaching a mirror to a vehicle according to claim 16, wherein said arm attachment structure includes at least one of an opening and a cylindrical member, and said arm pivots within said opening or about said cylindrical member, respectively.

18. The method of attaching a mirror to a vehicle according to claim 11, wherein said rear surface is adapted to press towards said side body panel and said side lip is adapted to be in contact with said door jamb of said vehicle.

19. The method of attaching a mirror to a vehicle according to claim 11, wherein the terminus is a free edge of said side lip which is a furthermost edge of the side lip from the rear surface along said continuous linear direction.

20. The method of attaching a mirror to a vehicle according to claim 19, wherein the terminus which is said free edge is formed by the termination of opposing surfaces of the side lip, said opposing surfaces terminating at the free edge such that the free edge defines a terminal boundary of the side lip.

* * * * *